3,338,090
APPLANATION TONOMETER
William F. Coombs, Jr., and Robert J. Meltzer, Irondequoit, N.Y., assignors to Bausch & Lomb Incorporated, Rochester, N.Y., a corporation of New York
Filed June 30, 1964, Ser. No. 379,123
11 Claims. (Cl. 73—80)

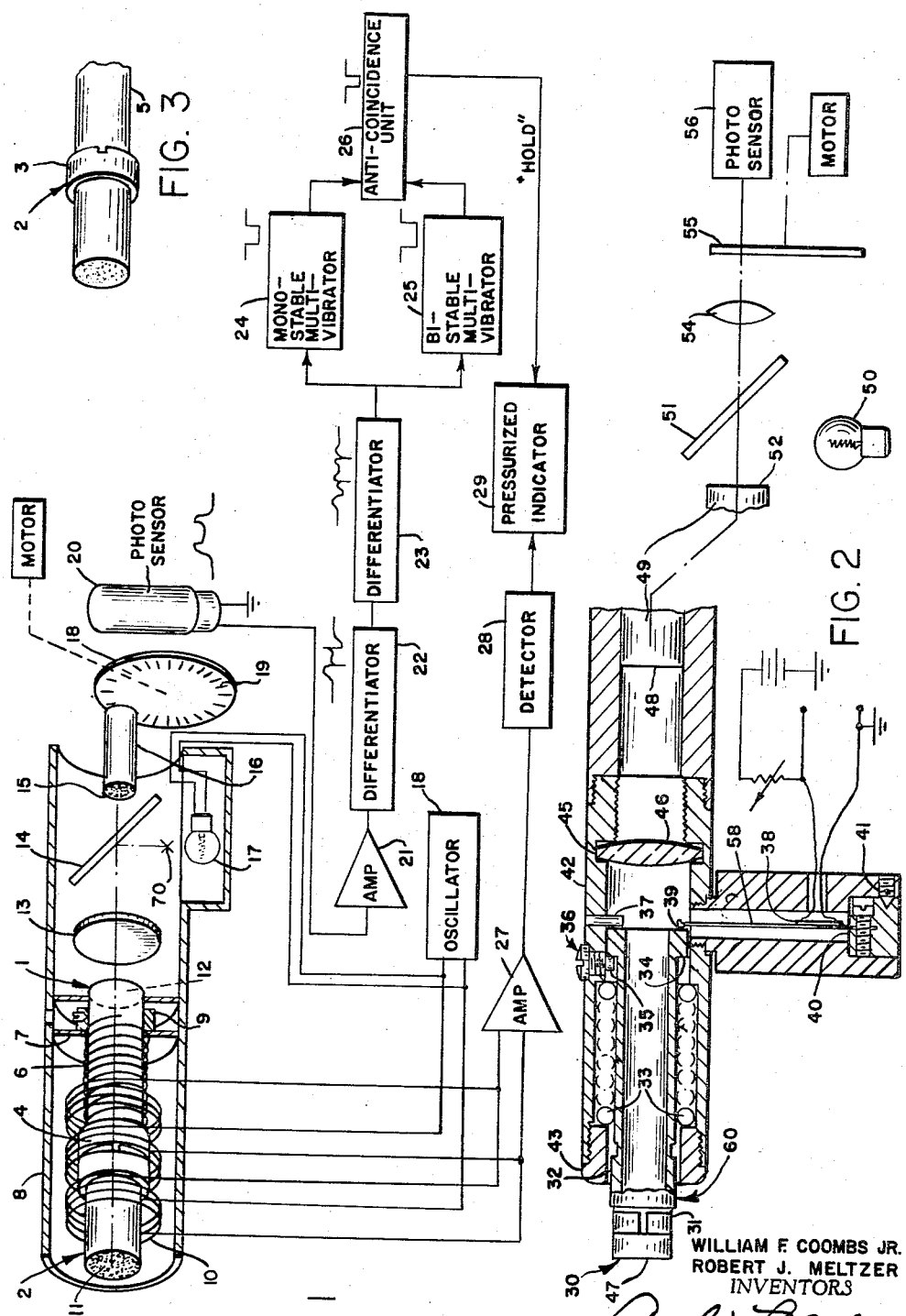

This invention relates to an applanation tonometer and more specifically to a replaceable tip and illuminating means in an applanation tonometer.

An applanation tonometer provides a measurement of intraocular pressure and is used in clinical tonometry. The device generally includes a probe having a planar surface adapted for engaging the cornea of the eye. By applying the planar surface in a contacting position on the eye a portion of the eye is flattened causing a limited displacement of the fluid from the portion of the eyeball which is deformed. The fluid pressure increase in the eye is small with a small fluid displacement and accordingly a reasonably accurate measurement can be made.

The relationship of normal intraocular pressure to a force required for flattening a predetermined area of the eye may be correlated to give a direct reading in units of pressure. By providing an electrical read-out system the diameter of the flattened surface is sensed and a signal is generated which provides a reading of the intraocular pressure units.

For convenience in operation and improvement in overall simplicity a light source may be inserted within the probe supporting structure. By use of an illuminating system and a dichroic mirror 17 to illuminate the flattened area coaxially through the probe the meniscus ring associated with the periphery of the contact area of the probe and the cornea is illuminated. The light emitted by the fluorescein meniscus ring is directed through the dichroic mirror efficiently to transmit an image to the read-out system.

Accordingly it is an object of this invention to provide a replaceable tip on an applanation tonometer probe.

It is a further object of this invention to provide coaxial illumination of the flattened area on the cornea which is coaxial with the optical system for efficient illumination of the tip and for transmission of the image from the tip.

It is a further object of this invention to provide a replaceable tip element on a tonometer probe which is the element in an optical system which deforms a portion of the cornea.

It is a further object of this invention to provide a target in the optical system for the patient to fix his direction of viewing.

The objects of this invention are accomplished by providing in combination with the read-out system a source of illumination illuminating a dichroic mirror which reflects light through the probe to provide illumination of the deformed portion of the cornea coaxial with the optical system. Fluorescein is placed in the eye to enhance the image of the meniscus ring about the peripheral contacting portion of the eye engaging a flat surface on the probe. The fluorescein fluoresces emitting light which is retro-directed through the probe and through the mirror to a light transmitting optical system. The exit end of the light transmitting system provides a plurality of optical signals which are scanned by a scanning device. The electrical system compares the time spaced pulses with a standard voltage pulse and generates a hold signal which is applied to a pressure indicating meter. A transducer is associated with the probe to generate a signal responsive to the displacement of the probe relative to the housing means which signal is applied to the pressure indicator. The displacement signal is applied to the pressure indicator which provides a reading of the intraocular pressure units. The indicator reads in direct proportion to the force applied to the probe as a result of a force displacement relationship calibrated to provide the proper read-out units.

The light source directs light against a dichroic mirror which reflects light into the probe. The light in the probe stimulates emission of light of a longer wavelength by the fluorescein placed in the eye. The light of longer wavelength is retro-directed through the mirror to a scanning system as the mirror transmits light of longer wavelengths. A photosensor receives a signal which is applied to an amplifier and passes through a double differential circuit in one embodiment. The differentiators apply the signals to a monostable multi-vibrator and a bistable multi-vibrator, and a comparator circuit compares the duration of the pulse with the monostable multi-vibrator with the bistable multi-vibrator and generates a pulse producing a hold signal on the pressure indicator when the inner diameter of the fluorescein ring exceeds a predetermined dimension.

The embodiments of this invention are described and illustrated in the attached drawings.

FIG. 1 illustrates the probe and a schematic diagram of the electrical circuit to provide an automatic read-out system.

FIG. 2 illustrates a strain gage in a modified probe and the optical system for transmitting an image.

FIGURE 3 is an illustration of a portion of the probe of FIGURE 1.

Referring to FIG. 1 the probe 1 includes a replaceable tip 2 which has a magnetized collar 3. The retainer 4 is a collar which receives the core 5 of the replaceable tip 2. The retainer 4 and the collar 3 are magnetized and are maintained in a fixed relative position of the two elements when they are assembled.

The spring 6 engages the disc 7 which is connected to the sleeve 8. The spring 6 biases the probe 1 to a forward position whereby the radial flange 9 which is fastened to the core 5 engages the disc 7.

The linear differential transformer 10 is fixed relative to the sleeve 8. The probe 1 may be displaced rearwardly by applying a force on the surface 11.

The source of illumination 17 is energized by the oscillator 18 and illuminates the surface of the dichroic mirror 14.

A target 70 may be positioned in a focal plane at lens 13 on the axis of the illuminating light which will appear at infinity to the patient. This gives a target to fix the direction of view of the patient and assists in consistently applanating the same portion of the cornea every time.

An image of the object on the surface 11 is transmitted through the probe 1 which includes a plurality of optical fibers which have a coherent relationship throughout the length of the probe 1. An image is formed on the exit surface 12 of the probe 1. The lens 13 projects the image through the dichroic mirror 14 to the surface 15. The image is then transmitted through the bundle of fibers 16.

The scanning disc 18 has a plurality of slits 19 which are rotated by the exit surface of the bundle of fibers 16. A plurality of images are projected on the photosensor 20. The images on the photosensor generate electrical signals of the nature as indicated by the wave form adjacent the photosensor. These signals are applied to the amplifier 21. The amplifier output signal is then applied to the first differentiator 22 which generates a wave form as indicated. This signal is applied to the second differentiator 23 and the output signal is as indicated by the second differentiator. The output signal of the second differentiator circuit is applied to the monostable multi-vibrator 24 and the bistable multi-vibrator 25. The outputs of the multi-vibrators are fed into the anti-coincidence circuit 26 which will produce a "hold" pulse when the duration of the bistable multi-vibrator output pulse exceeds the duration of the output pulse of the monostable multi-vibrator. This condition is present when the diameter of the fluorescein ring exceeds a predetermined dimension. The hold pulse is applied to the pressure indicator which causes the indicator to "hold" the reading present on the indicator, at this time.

The linear differential transformer generates an alternating signal in direct proportion to a force applied on the surface 11 of the probe 1. This signal is applied to the amplifier 27, rectified in the detector 20 and applied to the pressure indicator 29. The pressure indicator reads intraocular pressure in the desired units of pressure.

Referring to FIG. 2 a modification of the invention is shown. The replaceable tip 30 is received within a radially expanding clip 31 or any suitable means. The clip permits easy removal of the tip 30. The clip is integral with the sleeve 32 which is mounted for reciprocal movement on the ball elements 33. The sleeve 32 has a radially extending flange 34 extending intermediate a cam 35 on the screw 36, and a pin 37. The screw 36 in housing 42 may be rotated to adjustably locate the zero position of the sleeve 32 at its forward stop.

The sleeve 32 also engages the strain gage support 58 which extends to a contacting position on the rearward surface 39 of the sleeve 32. The strain gage 38 is mounted on element 40 and locked in position by a set screw 41. The housing 42 extends rearwardly to form an annular recess 45 which receives a lens element 46. The lens element relays the image formed on the face 47 of the tip 30 to form an image on the surface 48 of the fiber bundle 49. The light source 50 is energized by a suitable means and emits exciting radiation to the dichroic mirror 51 which radiation is reflected into the surface 52 of the bundle 49 and directed through the probe. The light emitted by the fluorescein on the surface 47 of the tip 30 is retro-directed through the probe and through the bundle 49 is light of longer wavelength than the exitation radiation and is efficiently transmitted through the dichroic mirror 51. The image is relayed by the lens 54 through the chopper 55 to the photosensor 56. The electrical read-out system is generally similar to that indicated in FIG. 1. The strain gage 38 generates an electrical signal responsive to the magnitude of a force producing a predetermined deformation of the strain gage.

The electronic system provides a hold pulse which fixes the reading present on the pressure indicator 29 when the diameter of the fluorescein in meniscus ring is of a predetermined diameter.

The operation of the device will be described in the following paragraphs. Basically both systems operate substantially the same and therefore the modification illustrated in FIG. 2 will be described in conjunction with the read-out system disclosed in FIG. 1. Prior to operation of the device a small amount of fluorescein is placed in the eye of the patient. The fluorescein together with the lachrymal fluid in the eye forms a meniscus about the periphery of the contacting surface 47 on the tip 30 with the cornea of the eye. An increasing force is applied on the housing 42 of the probe 60. As the force increases the area of deformation of the eye correspondingly increases until a predetermined diameter of contact area is reached. Even though the force is increased beyond this point the meter will "hold" the reading at this point to indicate to the operator the intraocular pressure when a predetermined area of deformation is present on the cornea of the eye.

As the probe is pressed against the eye a signal is generated by the strain gage 38 in response to displacement of the probe 60 relative to the housing 42. This displacement is linear and the frictional force due to static or dynamic friction in the circulating races of ball bearing elements 33 is negligible. The force causing a deformation of strain gage 38 generates a signal in the strain gage which is conducted to the amplifier 27 through the detector 28 to provide a direct reading intraocular pressure. The source of illumination 50 radiates an excitation light on the dichroic mirror 51. The light is reflected through the bundle 49 and lens 46 in the probe 60 to illuminate the meniscus ring formed about the periphery of contact by the surface 47 on the cornea. The fluorescein in the eye emits radiation of greater wavelength than the excitation radiation which is retro-directed through the probe 60 and the lens 46 and transmitted efficiently through the dirchroic mirror 51. The image of the meniscus ring is imaged on the light chopper 55 by means of lens 54. The light chopper 55 produces a plurality of light impulses. The light impulses are sensed by the photosensor 56 and applied to the amplifier 21. The wave forms of the signals are indicated adjacent to the elements of the circuit. The amplifier output is differentiated by the first and second differentiating circuit and provides double negative pulses. The bistable multi-vibrator generates a pulse duration directly responsive to the diameter of the fluorescein meniscus ring. The monostable multi-vibrator is triggerd by the input pulse from the differentiator and generates a pulse with a standard time duration. When the time duration of the pulse output from the bistable multi-vibrator exceeds the pulse duration of the monstable multi-vibrator a trigger signal is applied to the pressure indicator to "hold" the intraocular pressure indicated on the indicator at that time.

The tonometer probe as described indicates intraocular pressure. A linear differential transformer 10 or a strain gage 38 may be used to generate the signal for recording displacement of the probe relative to the supporting structure. The tip may be removed and replaced by another tip which is convenient and sanitary. Coaxial illumination produces maximum efficiency of lighting on the object forming the image and also permits relaying of the image through the mirror as the image is retro-directed rearwardly to the read-out system. This combination provides a unit which is convenient, practical and sanitary and adapts itself well to clinical use.

The preferred embodiments of this invention have been shown and described and it is understood that other modifications might be devised which would fall within the scope of the attached claims defining the scope of this invention.

We claim:

1. Apparatus for use in an applanation tonometer for indicating the magnitude of the area of an eye contacted by said tonometer comprising a probe reciprocally mounted within a housing means, an optically transparent tip in said probe adapted for engaging a surface of an eye and producing an image of a meniscus formed about the periphery of contact of said tip, an optical system positioned to transmit light through the probe and to receive reflected light therefrom, illuminating means including a dichroic mirror directing illumination toward said optical system for illuminating the tip of said probe, photosensing means generating a signal responsive to the area of contact formed on said tip, means receiving the signal from said photosensing means and indicating the magnitude of the area of the engaging surface of said tip with the surface of the eye.

2. An applanation tonometer comprising, an image transmitting probe movably mounted in a supported means having a tip adapted for engaging a surface of an eye and transmitting an image of the meniscus formed on duration directly responsive to the magnitude of contact the peripheral edge of the contacting surface of the tip, an optical system receiving the image and relaying the image through said system, means for directing a beam of radiation through said probe for illuminating at least the surface of said tip contacting the eye, photosensor means and electrical means sensing and generating a signal of time area of said tip, a transducer means coupled to said probe generating an electrical signal proportional to the displacement of the probe relative to the supporting means, a pressure indicator receiving the signal from said transducer means and indicating the intraocular pressure of the eye, means connected to said electrical means and said pressure indicating means for applying a locking signal from said electrical means to lock the pressure indicator when a pulse of predetermined time duration is generated in said electrical circuit means.

3. An applanation tonometer comprising, a movably mounted transparent probe having a replaceable transparent tip received in said probe adapted for engaging the surface of an eye and transmitting therethrough an image of the meniscus surrounding the contacting surface between the probe and the eye, means for directing a beam of radiation through said probe and said tip for illuminating the tip of said probe to enhance the image generated by the meniscus surrounding the surface contact area, an optical system mounted adjacent said probe receiving the image from said tip and relaying the image through said optical system, electrical sensing and generating means sensing and generating an electrical signal responsive to the magnitude of contact area of said tip and generating a hold pulse when a signal of greater than a predetermined time duration is generated in said electrical means, a transducer means in said probe generating a signal responsive to application force on said probe, a pressure indicator connected to said transducer means reading the intraocular pressure and simultaneously locking at a pressure when the signal of a predetermined time duration is generated in said electrical means.

4. An applanation tonometer comprising a probe having an optically transparent tip adapted for engaging the surface of an eye and transmitting therethrough an image of the portion of the eye so engaged, an optical system in said probe having an input end receiving an image from said tip and relaying the image through an exit end of said system, a dichroic mirror in said optical system, a source of illumination directing radiation on said mirror which reflects illumination through the tip of said probe and retro-transmitting an image of a second wavelength through said optical system, a scanning device scanning the exit end of said optical system, a photosensor and electrical means sensing and generating electrical signals of time duration responsive to the image of contact and generating a hold signal when the time duration is greater than a predetermined magnitude, a transducer associated with said probe generating an electrical signal of a magnitude linearly responsive to the displacement of said probe relative to its supporting means, a pressure indicator connected to said transducer and said electrical means "holding" the intraocular pressure reading when a signal of a predetermined time duration is generated by said electrical means.

5. An applanation tonometer comprising a probe movably mounted to a support means for transmitting an image, a replaceable transparent tip received on said probe adapted for engaging the surface of an eye and transmitting therethrough an image formed by the meniscus adjacent the peripheral edge of the contacting surface of said tip, an optical system including a dichroic mirror for transmitting an image formed by said meniscus, illuminating means directed on said dichroic mirror, said mirror reflecting the wavelength of illumination through said tip and said probe to illuminate the tip and transmitting therethrough a wavelength of the image formed of the meniscus surrounding the area of contact, a scanning device repetitively scanning the illumination transmitted through said mirror, a photosensor and electrical means sensing and generating pulses of time spaced duration responsive to the diameter formed by the meniscus on said tip, a transducer associated with said probe generating electrical signals directly responsive to the displacement of said probe relative to its supporting means, a pressure indicator connected to said transducer indicating intraocular pressure of the eye receiving a holding pulse to simultaneously lock the pressure indicated when a pulse of time duration greater than a predetermined standard is generated in said electrical means.

6. An applanation tonometer comprising a probe movably mounted to a support means for transmitting an image having an optically transparent tip on the forward end of the probe adapted for engaging a surface of an eye and transmitting therethrough an image formed by the meniscus surrounding the area of contact, an optical system including a dichroic mirror reflecting an illuminating light through said probe and said tip and transmitting a retro-reflected light having a longer wavelength than the illuminating light, illuminating means directing light on said mirror for illuminating the tip of said probe and the meniscus for emitting retro-reflected light, a scanning means repetitively scanning the light transmitted by said mirror, a photosensor and electrical means sensing and generating pulse signals of time duration directly responsive to the diameter of the area of contact of said tip, a transducer associated with said probe generating an electrical signal linearly responsive to the displacement of the probe relative to its supporting means, a pressure indicator connected to the transducer reading intraocular pressure and simultaneously receiving a hold pulse from said electrical means to lock the pressure indicated on said indicator when a pulse of a predetermined time duration is indicated by said electrical means.

7. An applanation tonometer comprising an image transmitting probe movably mounted in a supporting means having an optically transparent tip adapted for engaging the surface of an eye and transmitting therethrough a beam of radiation reflected from the eye corresponding to the area of the eye engaged, an optical system having illuminating means directing a beam of radiation through said transparent tip, chopper means for periodically chopping said reflected beam of radiation, radiation sensitive means receiving said reflected beam of radiation for generating an electrical signal corresponding to the magnitude of the surface area of engagement of said probe, transducer means coupled to said probe generating a signal proportional to the force causing displacement of said probe relative to its supporting means, and circuit means responsive to the signals generated by said radiation sensitive means and said transducer means for automatically providing and holding an indication of the intraocular pressure within the eye tested.

8. An applanation tonometer for measuring the intraocular pressure of an eye receiving a fluorescent solution comprising an image transmitting probe movably mounted on a supporting means having a tip for engaging the surface of an eye, an optical system in said probe having a dichroic mirror, means for illuminating the surface of said mirror to reflect illumination through said optical system, said probe and said tip to illuminate the tip surface of said probe, said dichroic mirror constructed and arranged in a manner to reflect the illuminating light of a first band of wavelengths and to transmit light of a second band of wavelengths corresponding to that emitted by said fluorescent solution through the optical system, means indicating the magnitude of the surface area of engagement of said probe with the eye, and means for indicating the force causing displacement of the probe relative to its supporting means to thereby provide a means for measuring intraocular pressure of the eye.

9. An applanation tonometer comprising a movably mounted radiation transmitting probe having an end adapted for contacting a portion of the surface of an eye to be tested and transmitting therethrough a reflected beam of radiation from the eye corresponding to the size of the area of contact, a transducer coupled to said probe for generating a signal that is a function of the force applied to the eye by said probe, radiation sensitive means for generating an electrical signal in response to radiation applied thereto, a source of radiation, first optical means positioned to transmit a beam of radiation from said source to said probe and to receive said reflected beam of radiation from the eye, second optical means positioned to direct said reflected beam of radiation toward said radiation sensitive means, scanning means periodically scanning at least one of said beams so that said radiation sensitive means generates a periodic signal having a time duration that is a function of the size of the area of contact of the eye by said probe end, indicator means for providing a reading corresponding to the intraocular pressure of an eye to be tested, and means coupling said radiation sensitive means and said transducer to said indicator means so that said indicator means automatically holds a reading corresponding to the intraocular pressure of an eye being tested.

10. An applanation tonometer comprising a resiliently mounted radiation transmitting rod having an end adapted for contacting a portion of the surface of an eye and transmitting therethrough a reflected beam of radiation from the eye corresponding to the size of the area of contact, a transducer coupled to said probe for generating a signal that is a function of the force applied to the eye by said rod, radiation sensitive means for generating an electrical signal in response to radiation applied thereto, a source of radiation, first optical means positioned to transmit a beam of radiation from said source to said rod and to receive said reflected beam of radiation from the eye, second optical means positioned to direct said reflected beam of radiation toward said radiation sensitive means, scanning means periodically scanning at least one of said beams so that said radiation sensitive means generates a periodic signal determined by the scanning rate of said scanning means and having a time duration that is a function of the size of the area of contact by said rod end, indicator means for providing a reading corresponding to the intraocular pressure of an eye to be tested, circuit means coupling said transducer to said indicator means for applying a signal corresponding to the amount of force applied by said rod end, circuit means coupled to said radiation sensitive means for generating a control signal when the time duration of said periodic signal reaches a predetermined value, and circuit means applying said control signal to said indicator means whereby said indicator means automatically holds a reading corresponding to the intraocular pressure of an eye tested in response to said rod being forced against an eye.

11. Apparatus for use in an applanation tonometer for measuring the size of the surface of an eye engaged by said tonometer comprising a radiation transmitting probe having an end adapted for contacting a portion of the surface of an eye and transmitting therethrough a reflected beam of radiation from the eye corresponding to the size of the area of contact, radiation sensitive means for generating an electrical signal in response to radiation applied thereto, a source of radiation, first optical means positioned to transmit a beam of radiation from said source to said probe and to receive said reflected beam of radiation from said eye, second optical means positioned to direct said reflected beam of radiation toward said radiation sensitive means, scanning means periodically scanning at least one of said beams so that said radiation sensitive means generates a periodic signal having a time duration that is a function of the size of the area of contact of the eye by said probe end, and circuit means coupled to said radiation sensitive means for measuring the time duration of at least a portion of said periodic signal to provide a measurement of the size of the area of contact of an eye contacted by said probe.

References Cited
UNITED STATES PATENTS

| | | | |
|---|---|---|---|
| 3,036,153 | 5/1962 | Day | 88—1 XR |
| 3,049,001 | 8/1962 | Mackay et al. | 73—80 |
| 3,070,997 | 1/1963 | Papritz et al. | 73—80 |
| 3,150,520 | 9/1964 | Mackay et al. | 73—80 |
| 3,181,351 | 5/1965 | Stauffer | 73—80 |

JAMES J. GILL, *Acting Primary Examiner.*

RICHARD C. QUEISSER, *Examiner.*

J. J. SMITH, *Assistant Examiner.*